United States Patent
Stroup et al.

(10) Patent No.: US 6,521,039 B2
(45) Date of Patent: Feb. 18, 2003

(54) CUPOLA SLAG CEMENT MIXTURE AND METHODS OF MAKING AND USING THE SAME

(76) Inventors: Willie W. Stroup, 9733 Hwy. 2830, Maceo, KY (US) 42355; Randy D. Stroup, 546 Henderson Grove Rd., Lewisport, KY (US) 42351; James H. Fallin, 110 4$^{th}$ St., Lewisport, KY (US) 42351

( * ) Notice: Subject to any disclaimer, the term of this patent is extended or adjusted under 35 U.S.C. 154(b) by 0 days.

(21) Appl. No.: 09/784,344

(22) Filed: Feb. 16, 2001

(65) Prior Publication Data

US 2002/0038617 A1 Apr. 4, 2002

Related U.S. Application Data

(60) Provisional application No. 60/183,370, filed on Feb. 18, 2000.

(51) Int. Cl.$^7$ .................................................. C04B 7/14
(52) U.S. Cl. ........................................................ 106/714
(58) Field of Search ......................................... 106/714

(56) References Cited

U.S. PATENT DOCUMENTS

| | | | |
|---|---|---|---|
| 1,627,237 A | | 5/1927 | Harding |
| 1,823,928 A | * | 9/1931 | Bjorkman |
| 1,831,702 A | | 11/1931 | Cadre |
| 1,916,157 A | | 6/1933 | Chappell |
| 2,248,032 A | | 7/1941 | Dunn et al. |
| 2,248,033 A | | 7/1941 | Wallace et al. |
| 2,446,990 A | | 8/1948 | Schuetz |
| 2,752,261 A | | 6/1956 | Dournaud |
| 2,803,556 A | | 8/1957 | Carlsson et al. |
| 2,947,643 A | | 8/1960 | Kamlet |
| 3,230,103 A | | 1/1966 | Minnick |
| 3,565,648 A | | 2/1971 | Mori et al. |
| 4,134,774 A | | 1/1979 | Heese et al. |

(List continued on next page.)

FOREIGN PATENT DOCUMENTS

| | | | |
|---|---|---|---|
| CS | 91288 | | 8/1959 |
| DE | 19533998 | * | 5/1996 |
| DE | 19533999 | * | 5/1996 |
| RU | 115252 | * | 12/1999 |
| SU | 1250533 | * | 8/1986 |
| SU | 1413072 | * | 7/1988 |
| SU | 1416464 | * | 8/1988 |
| SU | 1744078 | * | 6/1992 |
| SU | 1759803 | | 9/1992 |

OTHER PUBLICATIONS

"Investigation of Technology of Concert Mldg. Entry Cupolaslag & Spect Molding Sand" Fedin et al Statr Mater. (1996)8, 28–29.

"Development & Testing of an Altermation Binder System for Bright Manuf., for Cupolas" Schaaf et al. Giesserei (1996) 83(22), 11–18.

(List continued on next page.)

Primary Examiner—Paul Marcantoni
(74) Attorney, Agent, or Firm—Howrey Simon Arnold & White, LLP; Michael J. Bell; MIchael J. Stimson

(57) ABSTRACT

A slag cement mixture and process of making the same is disclosed. The slag cement mixture is composed of cupola slag and portland cement. The cupola slag is optionally ground granulated. One embodiment of the process includes rapidly quenching the slag by submersion into water or by spraying water onto it, and grinding the resulting product to achieve a fineness of at least 6,000 cm$^2$/g. The process also includes the addition of 35% ground granulated cupola slag to portland cement to achieve a stronger and harder cement than portland cement alone.

39 Claims, 3 Drawing Sheets

U.S. PATENT DOCUMENTS

| | | | |
|---|---|---|---|
| 4,306,912 A | * | 12/1981 | Forss |
| 4,369,054 A | | 1/1983 | Shinholster, Jr. et al. |
| 4,377,416 A | | 3/1983 | Maul et al. |
| 4,715,896 A | | 12/1987 | Berry |
| 4,842,649 A | | 6/1989 | Heitzmann et al. |
| 4,964,912 A | | 10/1990 | Okabayashi et al. |
| 4,968,349 A | | 11/1990 | Virtanen |
| 5,073,198 A | | 11/1991 | Kurz |
| 5,084,102 A | | 1/1992 | Brouns et al. |
| 5,275,511 A | | 1/1994 | Pelletier et al. |
| 5,311,944 A | | 5/1994 | Cowan et al. |
| 5,346,548 A | | 9/1994 | Mehta |
| 5,374,309 A | | 12/1994 | Piniecki |
| 5,393,342 A | * | 2/1995 | Hooykaas ................... 106/714 |
| 5,395,443 A | | 3/1995 | Hooykaas |
| 5,421,880 A | | 6/1995 | Young |
| 5,473,998 A | | 12/1995 | Allen et al. |
| 5,482,549 A | * | 1/1996 | Blaakmeer et al. ......... 106/606 |
| 5,494,515 A | | 2/1996 | Young |
| 5,553,670 A | | 9/1996 | Cowan |
| 5,556,457 A | | 9/1996 | Terza et al. |
| 5,714,002 A | | 2/1998 | Styron |
| 5,714,003 A | | 2/1998 | Styron |
| 5,766,297 A | | 6/1998 | Piniecki |
| 5,976,243 A | | 11/1999 | Oates et al. |
| 5,997,632 A | | 12/1999 | Styron |
| 6,007,619 A | | 12/1999 | Laas et al. |
| 6,008,275 A | | 12/1999 | Moreau et al. |

OTHER PUBLICATIONS

"Use of Electro Steel Methy & Cupola Slags at Machine Blds Plants" Krivilev et al. Trural Nachno–Issled Ins Chern Met, 1979.*

"Granulated Cupola Slag in Cement Making" Sinhanhapatra et al., MML Tech J (1966), 8(3), 29–32.*

"Slag Blacks from Foundy Wastes" Stroit Mater Kinstr (1998), Lesovik et al., (3), p 15–16.*

"Slag Alkali Binders from Cupola Slags" Kriverko et al. Stroit Mat Konstr 3–4 16–17, 1992.*

Krivilev et al., "Use of electric steel–smelting and cupola slag of machine building factories," Tr. Ural Navchno–Issled. Inst. Chern. Met. vol. 35, pp. 106–108 (1979). Original Russian and English Translation provided.

Krivenko et al., "Slag–alkali binders from cupola slag," Building Construction Material vol. 3–4, pp. 16–17 (1992) Original Russian and English Translation provided.

Sinhamahapatra et al., "Investigations on Granulated Cupola Slag in Cement Making,"National Metallurgical Laboratory Technical Journal vol. 8(3), pp. 29–32 (1966).

ASTM Designation: C 989–99 "Standard Specification for Ground Granulated Blast–Furnance Slag for Use in Concrete and Mortars" (1999).

* cited by examiner

CUPOLA SLAG CEMENT MIXTURE AND METHODS OF MAKING AND USING THE SAME

RELATION TO PRIOR APPLICATION

This application claims priority to U.S. Provisional Patent Application Ser. No. 60/183,370, filed Feb. 18, 2000.

FIELD OF INVENTION

The present invention relates to cement. More particularly, the present invention relates to a slag cement mixture and a process of making the same. While the invention is subject to a wide range of applications, it is especially suited for use in structural concrete and concrete construction.

BACKGROUND

Cement is a widely used building material. A particularly popular variety of cement is portland cement. Portland cement is used in many applications such as mortar, concrete, and cement building materials such as building blocks. Portland cement is produced by pulverizing clinker to a specific surface area of about 3,000 to 5,000 $cm^2/g$ or finer. Clinker is created in a cement kiln at elevated temperatures from ingredients such as limestone, shale, sand, clay, and fly ash. The cement kiln dehydrates and calcines the raw materials, and produces a clinker composition comprised of tricalcium silicate ($3CaO\text{—}SiO_2$), dicalcium silicate ($2CaO\text{—}SiO_2$), tricalcium aluminate ($3CaO\text{—}Al_2O_3$), and tetracalcium aluminoferrite ($4CaO\text{—}Al_2O_3\text{—}Fe_2O_3$).

Conventional mortar and concrete compositions contain cement, aggregates such as gravel and sand, and water to activate the hydration process. A mortar product is a hardened cement product obtained by mixing cement, a fine aggregate, and water. A concrete product is a hardened cement product obtained by mixing cement, coarse aggregate, water, and often a fine aggregate as well.

The strength properties of concrete and mortar products depend in part on the relative proportions of cement, aggregates, and water. The American Society for Testing and Materials ("ASTM") standard test procedures, such as ASTM C192 and C39 describe the procedures for mixing, casting, curing, and testing portland cement concrete mixtures with 1, 3, 7, 14, and 28 day standards. Greater compressive strength is a desirable feature of cement, and a number of materials have been used to improve the compressive strength of cements.

One way of improving the compressive strength of hardened cement is to blend ground granulated blast furnace slag with cement to give an improved cement composition. Blast furnace slag is a by-product of the production of iron in a blast furnace consisting of silicates and aluminosilicates of calcium. A quick setting cement can be produced by grinding blast furnace slag with gypsum. (See, for example, U.S. Pat. Nos. 1,627,237 and 2,947,643). Blast furnace slag has hydraulic properties very similar to portland cement, and adding blast furnace slag to cement is routine to increase the cement's strength. (See ASTM Specification C989).

Typical North American blast furnace slag composition ranges are 32–40% $SiO_2$, 7–17% $Al_2O_3$, 29–42% CaO, 8–19% MgO, 0.7–2.2% $SO_3$, 0.1–1.5% $Fe_2O_3$, and 0.2–1.0% MnO. (see The Portland Cement Association Research and Development Bulletin RD112T). Blast furnaces in the U.S. are operated using a basic slag, typically defined as the slag ratio: $(\%\ CaO+\%\ MgO)/(\%\ SiO_2+\%\ Al_2O_3)$, where the slag ratio is maintained in excess of 1.0 in order to remove sulfur from the iron produced and to facilitate producing an iron of high carbon content. The chemical composition of blast furnace slag also varies world wide, especially in alumina content. Blast furnace slags have long been recognized as very useful commodities and have been used in a number of applications. In addition to its use as cement additive, blast furnace slag has been used in asphalt, sewage trickle-filter media, roadway fills, and railroad ballast.

Blast furnace slags can be used to prevent excessive expansion of concrete mixtures that have a high-alkali content and aggregates that are alkali-reactive. Use of blast furnace slag as 40% or more of such a cement mixture can prevent excessive expansion. Blast furnace slag is characterized by its short setting time, which is the time between the addition of mixing water to a cementitious mixture and when the mixture reaches a specified degree of rigidity as measured by a specified procedure.

Steel slag is also used as a cement additive. Steel slag is formed in the process of making steel in a blast furnace, and often has a high concentration of ferrites. Because of its high ferrite composition, steel slag is generally used as a filler in cement road building material or as a feedstock raw material in cement kilns. It is possible to produce a hydraulic cement base from steel slag by adding further minerals to the slag portion, thereby reducing the ferrite composition of the slag. This additional step, while rendering a usable product, is costly and time consuming.

Mixtures of blast furnace slag and steel slag have resulted in stronger cement products, but cupola furnace slag, a by-product of cast iron production, is only rarely used in cement except as a processing addition. (See ASTM C465 and Cupola Handbook, published by the American Foundrymen's Society). Blast furnaces and cupola furnaces are operated differently and are used to make different iron products, consequently, the slag products of these furnaces are also different, both in chemical composition and in material properties. Cupola slag has different hydraulic properties than blast furnace slag. For example, cupola slag blended cement sets more slowly and at 7 days lacks the strength of blast furnace slag blended cements. Also, cupola slag is not a common concrete additive due to environmental concerns such as the possibility of rain water leaching out some of its components. Indeed, cupola slag often presents a disposal problem, which creates an additional expense, ultimately increasing the cost of the iron produced.

There is an ever present need in the cement art for harder, stronger cement products with longer setting times. There is also a need in the cast-iron production art for a disposal method for cupola slag that is environmentally safe and economically practical.

SUMMARY OF THE INVENTION

Accordingly, the present invention is directed to a cupola slag blended cement with an increased compressive strength. The principal advantage of the present invention is a cement mixture that results in a concrete which is both harder and stronger while providing a means of recycling cupola slag that is both environmentally sound and economically practical. The cement compositions of the present invention have a resistance to expansion due to sulfate attack and alkali silica reaction, and can be formulated to have a wide range of curing times.

To achieve these and other advantages and in accordance with the purpose of the invention, as embodied and broadly described, the invention is a hydraulic cement containing cupola slag ground to a fineness of greater than 4,000 cm$^2$/g blended with portland cement. A preferred embodiment of the invention is a hydraulic cement containing cupola slag ground to a fineness of greater than 5,000 cm$^2$/g blended with portland cement. In the most preferred embodiment, the invention is a hydraulic cement containing cupola slag ground to a fineness of between 6,000 cm$^2$/g and 7,000 cm$^2$/g.

In one embodiment, the invention is a hydraulic cement containing from about 20 to 50% of a ground granulated cupola furnace slag blended with portland cement. In a preferred embodiment, the invention is a hydraulic cement containing from about 30% to 40% cupola slag blended with portland cement. In another preferred embodiment, the invention is a hydraulic cement containing about 35% cupola slag blended with portland cement.

The invention includes ground granulated cupola furnace slag with a fineness of about 5,000 to about 7,000 cm$^2$/g and meeting the fineness requirement of the ASTM C989 Grade 100 specification for blast furnace slag.

The invention includes ground granulated cupola furnace slag with a fineness of about 6,000 to about 6,750 cm$^2$/g. The invention also includes ground granulated cupola furnace slag with a fineness of about 6,500 cm$^2$/g.

In one embodiment of the invention, a blended cement mixture of about 35% cupola furnace slag displays a 28 day compressive strength of more than 7,000 psi and a flexural strength of more than 700 psi.

In another embodiment of the invention, the total heat of hydration of the blended cement mixture of about 35% cupola furnace slag does not exceed 250 J/g when measured for 72 hours, and the expansion of mortar bars does not exceed 0.20% at when measured at 14 days.

In one embodiment, the invention includes a process of using cupola slag as a raw cement kiln feedstock.

BRIEF DESCRIPTIONS OF THE DRAWINGS

DETAILED DESCRIPTION OF THE INVENTION

Figure 1:
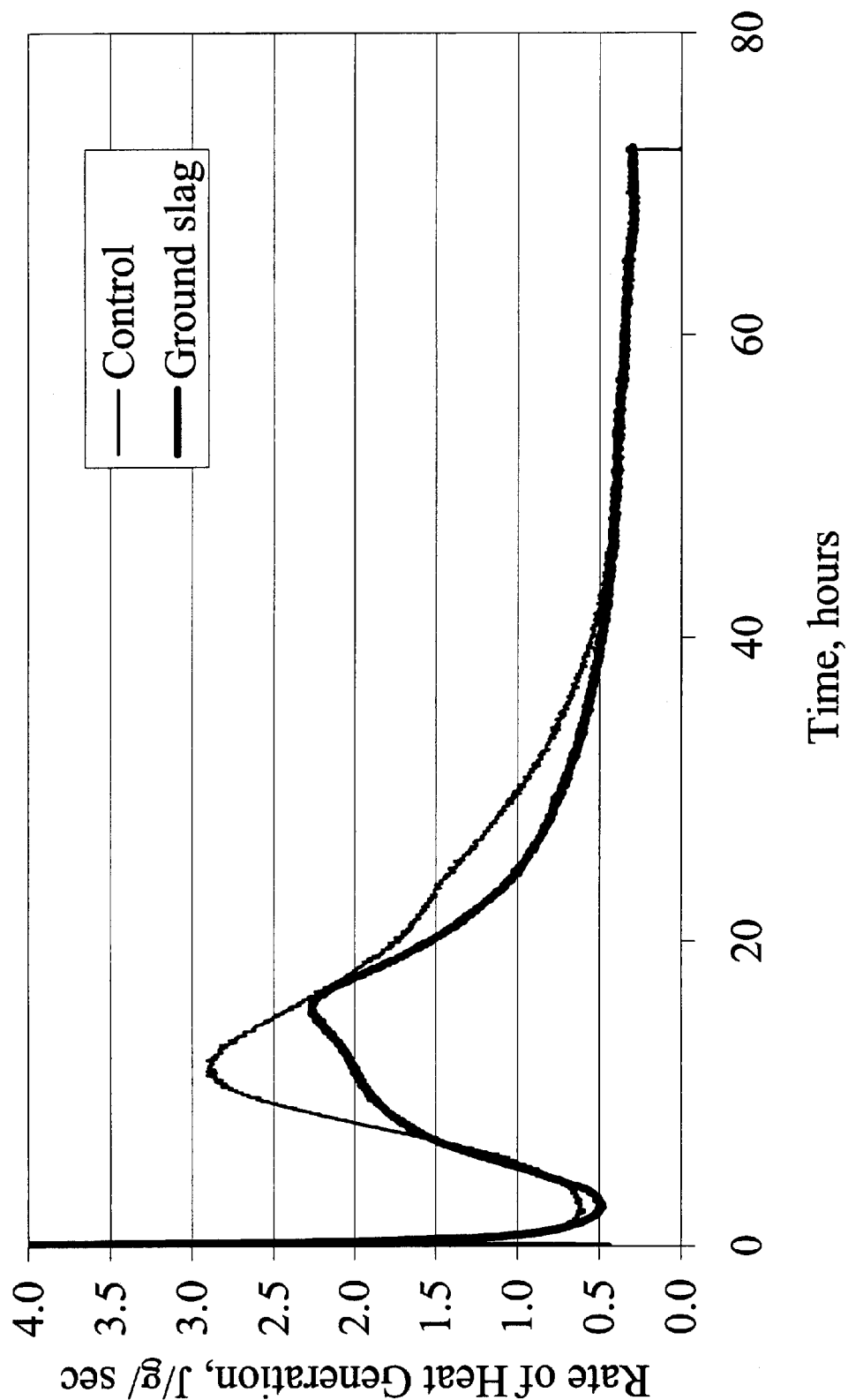
FIG. 1 shows the results of conduction calorimetry tests performed on two neat cement pastes: standard portland cement (darker line), and a portland cement/cupola slag blend (lighter line).
Figure 2:
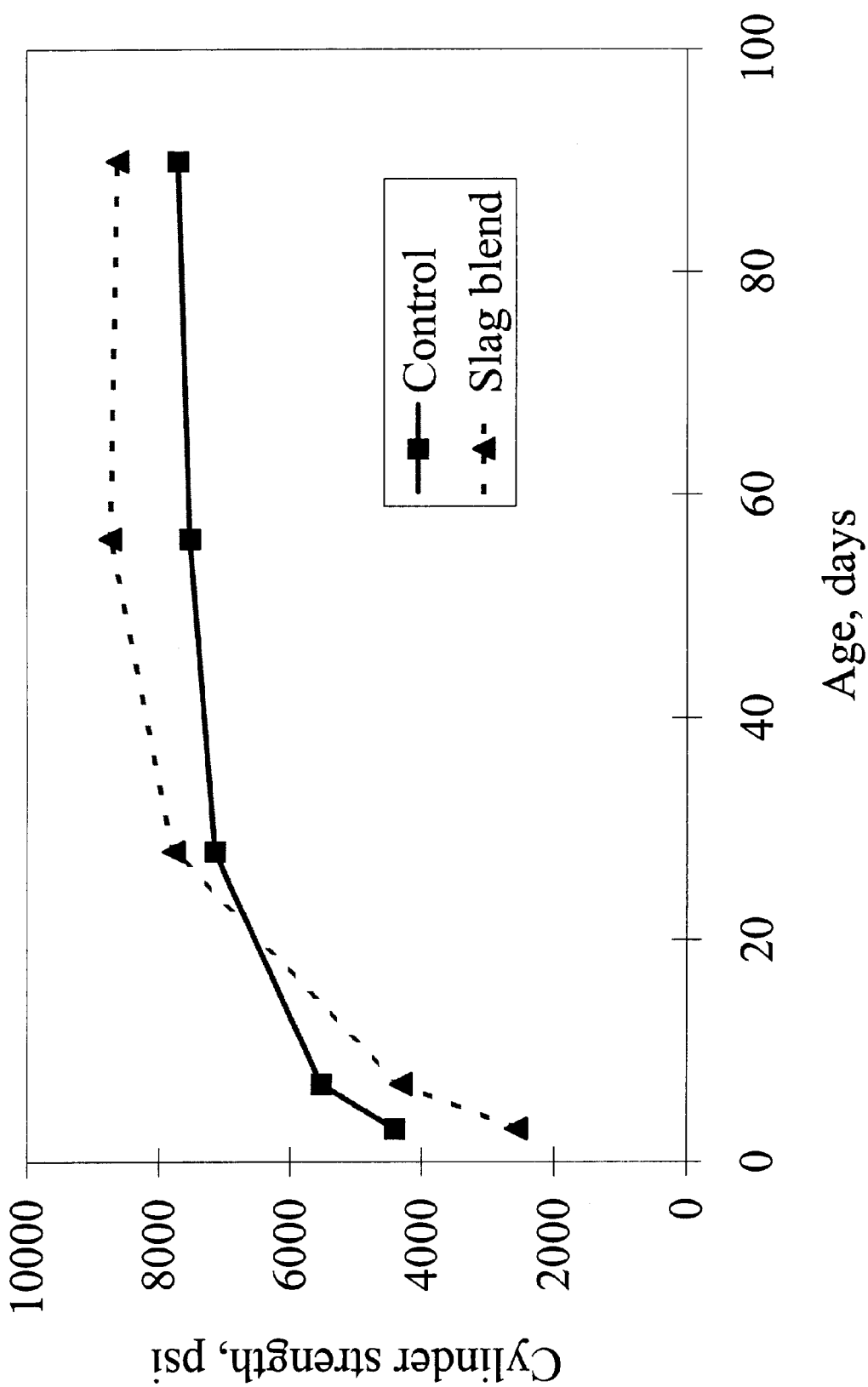
FIG. 2 shows the results of compressive strength tests performed on concrete objects made with the same aggregates, but using either standard portland cement (solid line), or a 65/35% blend of portland cement and cupola slag (dashed line).
Figure 3A:
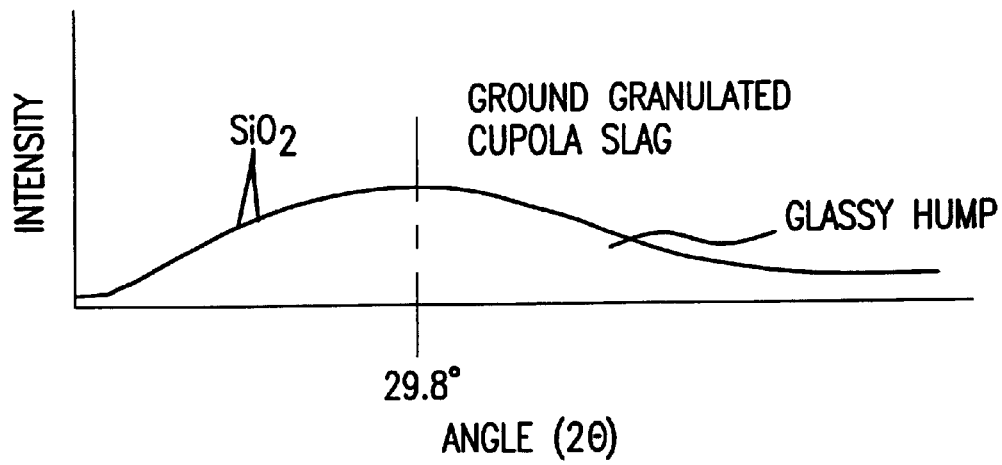
FIG. 3 shows the results of X-ray powder diffraction tests performed on cupola furnace slag (upper diffractogram) and on blast furnace slag (lower diffractogram).
Figure 3B:
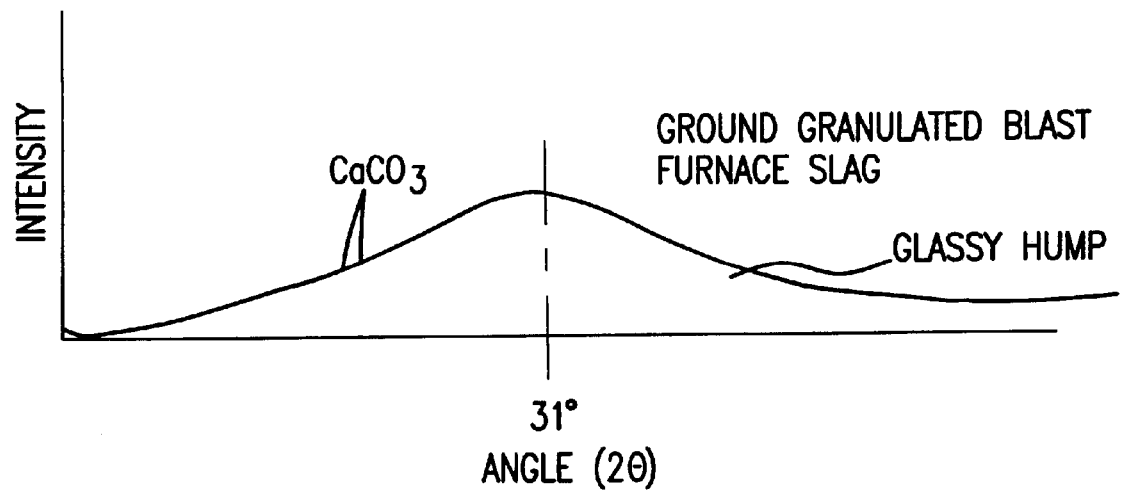

The present invention encompasses blends of cupola slag and cement with an increased hardness and strength than the cement alone.

The hydraulic cement compositions of the present invention provide a solution to the current needs of the art by converting cupola furnace slag into a useful product. The cement compositions of the invention can be formulated to have a wide range of resistance to sulfate attack as well as wide range of curing times so that they can be used for a variety of purposes such as making concrete objects. In particular, a hydraulic cement containing 35% of a ground granulated cupola furnace slag, with a fineness of at least 6,000 cm$^2$/g and meeting the fineness requirement of the ASTM C989 Grade 100 specification for blast furnace slag blended with portland cement creates a composition whose superior compressive strength develops slower than the concretes currently in use thus providing a more durable concrete product. Additionally, the sulfate attack resistance of the present invention increases the useful life of any products made from cupola furnace slag blended cements thereby increasing the length of time between replacing such products and reducing the overall cost of any such project.

The chemical composition of portland cement plays an important role in the way that slag blended cements cure, age and resist chemical attack. The processing of portland cement is well known in the art, as are the various methods to alter the chemical composition during the manufacturing process. The invention is not, however, limited to portland cement. It is believed that cupola slag mixed with other cements will improve the strength of the cement/cupola slag mixture.

A cupola furnace is a vertical shaft furnace used to produce cast iron by high temperature melting of metallic and mineral charge materials. A cupola furnace contains a continuous melting shaft which can accept a wide range of raw materials including oily, wet and contaminated scrap. Compared to batch-type furnaces, the energy requirements of a cupola furnace are low. Molten iron is tapped from the bottom of the furnace. Slag is removed in a molten state via a slag hole. Cupola furnace slag is preferably rapidly quenched by submersion into water to yield a fine, granulated product, thus reducing the amount of grinding required to make the slag useful in cement. Alternatively, water may be sprayed upon the slag to quench it, or the slag may be allowed to air-cool for a time, resulting in a coarser, non-granulated product.

Cupola furnace slag differs from blast furnace slag in chemical composition; for example, cupola slag has a higher silica content and a lower calcium oxide content than blast furnace slag. While blast furnaces operate using a basic slag, cupola furnaces generally operate using an acid slag for the production of gray cast iron. (Basic slags are sometimes used in cupola furnaces for the production of ductile iron because the basic slag removes sulfur in the cupola during melting). Blast furnace operations produce about 30 percent slag per ton of molten iron, while cupola furnace operations produce 5 to 6 percent slag per ton of iron ore that is melted.

Cement users are particularly interested in setting and strength development characteristics. The maximum and minimum setting times and minimum strengths of reference cement are specified in the ASTM C150 standard specification for portland cements. A number of minor components which form in the clinker from impurities present in the raw materials or fuel can influence both the clinker formation process and the hydraulic reactivity and cementitious properties of the resulting cementitious material. In particular, the level of alkalis, such as $K_2O$ and $Na_2O$ present in cement, especially portland cement, may be of concern. For example, if the cementitious materials are combined with aggregates containing $SiO_2$, the alkalis present in the cementitious materials may react with the $SiO_2$ to form an expansive alkali silica gel, which can lead to cracking and break up of the concrete structure. Because the detection of reactive $SiO_2$ in aggregates is difficult, cementitious materials with low alkali content are generally used. Blast furnace slags are generally very basic in nature. Thus, a maximum equivalent $Na_2O$ of about 0.6 percent is included as an optional limit in the ASTM C150 specification.

It is possible to use cement containing more than 0.60 percent equivalent $Na_2O$ with $SiO_2$ reactive aggregates while avoiding excessive expansion and reducing the total energy used to manufacture the cement. One example is to mix cement, preferably portland cement, with latently hydraulic materials such as ground granulated blast furnace slag. However, the latently hydraulic materials do not react as quickly as portland cement, and as a result they contribute to the later developed cement strength rather than the earlier. The decreased early activity results in lower heats of hydration, which leads to thermal crack formation. However, the addition of blast furnace slag does not eliminate thermal crack formation.

ASTM C125–99a "Standard Terminology Relating to Concrete and Concrete Aggregates" defines a number of terms that apply to hydraulic cement. It is well known in the prior art, that the hydraulic properties of blast furnace slag vary greatly upon the chemical nature of the blast furnace slag and the way that molten slag is cooled.

Blast furnace slag is classified by performance in the blast furnace slag activity test in three grades, Grade 80, Grade 100, and Grade 120. ASTM specification C989 outlines the strength development of portland cement mixed with the three strength grades of finely ground, granulated blast furnace slag as measured at seven days and twenty-eight days and expresses this as blast furnace slag activity index (SAI). When blast furnace slag is used in concrete with portland cement, the levels and rate of strength development depend on the properties of the blast furnace slag, the portland cement, the relative and total amounts of the blast furnace slag and the cement as well as the cement curing temperatures. Unless the slag is derived from a blast furnace it cannot be marketed as blast furnace slag under the ASTM C989 standards.

ASTM C989 specifies that the reference cement used to test blast furnace slag activity have a minimum 28-day strength of 35 MPa (5,000 psi) and an alkali content between 0.6 and 0.9%. To properly classify a blast furnace slag, the reference portland cement must conform to the limits on strength and alkali content under ASTM specification C989. Test data indicate that concrete compressive strengths at 1, 3 and even 7 days tend to be lower using blast furnace slag cement combinations. Generally a higher numerical grade of blast furnace slag can be used in larger amounts and will provide improved early strength performance, but tests must be made using job materials under job conditions to properly access the performance of a blast furnace slag cement.

Blast furnace slag has latent hydraulic properties that require an activator to realize these hydraulic properties. One way for slag to acquire hydraulic properties is to rapidly quench the slag to preserve the molten slag in a vitreous state. Two processes that are commonly used to activate the slag's hydraulic properties are granulation and pelletization. In the granulation process, slag is quenched by the injection of a large quantity of water under pressure into the slag. If the temperature of the slag is above its melting point prior to quenching, then quenching produces a wet sand-like material with a high degree of vitrification. But if the slag is permitted to cool slowly, it crystallizes and exhibits reduced hydraulic properties. To achieve the desired fineness, the granulated slag is dried and ground. Blast furnace slags are typically ground to a specific surface area of 5,000 to 6,500 $cm^2/g$. A fineness of greater than 6,500 $cm^2/g$ requires additional steps and is more difficult to achieve on a large industrial scale under dry conditions. Another measure of specific surface area is the Blaine air permeability method. The Blaine Fineness test is described in ASTM C204 "Standard Test Method of Hydraulic Cement by Air Permeability Apparatus." There, blast furnace slags are described as having a specific surface area of 5,000 to 6,500 $cm^2/g$. The early development of high strength is a characteristic of cements comprising blast furnace slag ground to a fineness of 7,500 $cm^2/g$. As the fineness increases so does the rate of the hardening reaction. As ground granulated blast furnace slag typically has a fineness of about 5,000–6,500 $cm^2/g$, an extra grinding step is required to achieve a fineness of 7,500 $cm^2/g$. There is an energy cost for the extra grinding step, but it substantially improves the mechanical strength of the resulting cement. Greater specific surface areas generally result in greater initial strengths.

Cupola furnace slag can be granulated by the process of slag quenching. Molten cupola furnace slag is granulated by the injection into the slag of a large quantity of water under pressure, producing a wet sand like material with a high degree of vitrification. The degree of vitrification depends on the slag temperature prior to injection and the temperature of the water under pressure. Because cupola slag has a lower sulfate and magnesium content and a higher silica and iron oxide content there is a decrease in the heat generated, which is advantageous for increasing setting time and slowing the initial strength gain of the concrete. The lower sulfate and magnesia content coupled with a higher silica and iron oxide content also leads to a reduction in the expansions due to heat of hydration and alkali silica reaction.

For the purpose of illustrating the advantages obtained by the practice of the present invention, plain concrete mixes were prepared and compared to similar mixes containing cupola slag. The following example is illustrative and is not intended to be limiting. The methods and details were in accordance with current applicable ASTM standards.

EXAMPLE 1

Cupola furnace slag useful in cement compositions of the present invention desirably shows the following components upon analysis: Table 1. Composition of Cupola Slag

TABLE 1

Composition of Cupola Slag

| Component | Proportion (wt. %) |
| --- | --- |
| $SiO_2$ | 43.87 |
| $Al_2O_3$ | 8.5 |
| $Fe_2O_3$ | 1.93 |
| CaO | 33.3 |
| MgO | 3.38 |
| $SO_3$ | 0.30 |
| $Na_2O$ | 0.10 |
| $K_2O$ | 0.30 |
| $TiO_2$ | 0.34 |
| $P_2O_5$ | <0.01 |
| $Mn_2O_3$ | 1.18 |
| SrO | 0.08 |
| L.O.I. (950° C.) | 4.34 |
| Total | 97.84 |
| Alkalies as $Na_2O$ | 0.30 |

Although only applicable to blast furnace slag, the Slag Activity Index test as described in ASTM C989 "Standard Specification for Ground Granulated Blast Furnace Slag for Use in Concrete" was performed on the cupola furnace slag as well as a Blaine Fineness test as described in ASTM C204 "Standard Test Method of Hydraulic Cement by Air Permeability Apparatus." Table 2 shows the results of these two tests for two different cupola slag samples ground using a 40-lb mill to two different fineness values similar to those of commercially available blast furnace slags.

TABLE 2

Fineness and Slag Activity Index data

|  |  | Ground Cupola Slag Sample | | ASTM C989 Requirement for: | |
|---|---|---|---|---|---|
|  |  | No. 1 | No. 2 | Grade 80 min | Grade 100 min |
| Fineness, cm$^2$/g |  | 4240 | 6530 | — | — |
| Slag Activity | At 7 days | 61 | 73 | — | 70 |
| Index, % of control | At 28 days | 98 | 124 | 70 | 90 |

As evident from Table 2, both samples exceeded the ASTM C989 SAI requirements for Grade 80 and Grade 100 blast furnace slag at 28 days. Sample 2 met the SAI 7 day requirements for Grade 100 as well. Based on this test, all additional tests were preformed on Sample 2.

Conduction calorimetry tests were conducted on neat cement pastes made with the control cement and with cupola furnace slag blend by injection-mixing of 2 grams of cement with water inside a calorimeter cell. The slag used in this test was Sample 2 as it met the ASTM C989 Blast Furnace Slag Activity Index requirement for 7-day and 28-day of commercially available blast furnace slag Grade 100. The heat of hydration was recorded over a 72 hour period. The first peak represents the heat reaction as the cement comes into contact with the mix water. After the initial peak there is a period of relative inactivity during which the paste remains plastic. The second peak indicates an accelerated reaction during which the alite in the cement hydrates rapidly and heat is generated. The initial setting of the paste occurs soon after the beginning of the acceleration period and the final setting occurs towards the end of the acceleration period. A maximum in heat evolution is reached soon after the final set, after which the heat evolution declines to a steady state. The heat of hydration is a function of both the chemical and the physical properties of the cement. Table 3 shows the results of the calorimetry tests.

and the cupola furnace slag cement is that the onset of alite hydration and the peak of hydration are both much later in the cupola slag cement than in the control. Initially the total heat released for alite hydration is lower for the cupola slag cement but by the time the peak of alite hydration occurs, the total heat generated is higher for the cupola slag cement than the control cement. Total heat released overall remains lower for the cupola slag cement at each of the time periods measured. It is anticipated that the surprising low-heat properties of the cupola slag cement will make it particularly useful in making concrete that is adapted for mass concrete pours such as raft foundations, bridge decks, piers, and dams.

Resistance to sulfate attack on Sample 2 was tested in accordance with ASTM C1012 "Standard Test Method for Length Change of Hydraulic-Cement Mortars Exposed to a Sulfate Solution". The expansion of the control and the blended cupola furnace slag cement at 15 weeks was 0.026 and 0.015% respectively.

The potential for the cupola slag to modify alkali reactivity was determined using ASTM C1260 "Standard Test Method for Potential Alkali Reactivity of Aggregates (Mortar Bar Method)". The cement used in this test was the cupola furnace slag bend of sample 2, and the aggregate was a highly reactive graded Albuquerque sand. Table 4 shows the results.

TABLE 4

Expansion of Bars Due to Alkali Silica Reaction

|  | Expansion, % | |
|---|---|---|
| Age, Days | Control | Cupola Slag Blend |
| 0 | 0.000 | 0.000 |
| 5 | 0.009 | 0.013 |
| 11 | 0.349 | 0.77 |
| 14 | 0.580 | 0.195 |

Table 4 indicates that the potential of cupola slag to modify alkali reactivity is considerably lower for cupola slag at days 11 and 14 than the control.

TABLE 3

Heat Generation Data for Portland Cement and Cupola Furnace Slag Blended Cement

|  | Control | | | Cupola Slag Blend | | |
|---|---|---|---|---|---|---|
| Description | Time | Rate of heat generation J/Kg/sec | Total Heat J/g | Time | Rate of heat generation J/Kg/sec | Total Heat J/g |
| Initial Hydration Peak | 2.28 min | 48.74 | 3.35 | 3.48 | 23.55 | 2.51 |
| Total Heat at: | 0.5 hr |  | 15.43 | 0.5 hr |  | 11.07 |
| Onset of Alite Hydration | 2.15 hr | 0.59 | 20.15 | 3.09 hr | 0.51 | 17.26 |
| Peak of Alite Hydration | 11.20 hr | 2.91 | 71.17 | 15.30 hr | 2.70 | 89.28 |
| Total Heat at: | 24 hr |  | 169.61 | 24 hr |  | 140.91 |
| Total Heat at: | 48 hr |  | 235.70 | 48 hr |  | 193.40 |
| Total Heat at: | 72 hr |  | 264.33 | 72 hr |  | 223.19 |

Table 3 indicates that the initial hydration peak for cupola slag cement occurs later in time than that of the control cement and generates heat at a much slower rate and generates a lot less heat. Total heat one half hour after hydration is considerably lower for cupola furnace slag as well. Another major difference between the control cement Compression and flexural strengths of a blended cement containing 35% cupola furnace slag (Sample 2) was measured at day 3, day 7, day 28, day 56 and day 90 and compared to a control cement measured with the same age in days. No chemical additives were added to either mix and the mixes were made with the same cementitious content as well as the same water to cementitious ratio. The mix portions of the two cements are shown in Table 5 while the results of the compression and flexural tests are shown in Table 6.

TABLE 5

Concrete Mix Proportions

| Material | Mix Proportions | |
|---|---|---|
| | Control | Cupola Slag Blend |
| Portland Cement, pcy* | 654 | 426 |
| Slag, pcy | 0 | 229 |
| Eau Claire sand, pcy | 1,342 | 1,336 |
| Eau Claire ¾" stone, pcy | 1,847 | 1,849 |
| Water, pcy | 266 | 267 |
| Slump, inches | 5 | 7 |

(*pounds per cubic yard)

TABLE 6

Compressive and Flexural Strength Results

| | Compressive Strength (ASTM C39), psi | | Flexural Strength (ASTM C78), psi | |
|---|---|---|---|---|
| Age, Days | Control | Cupola Slag Blend | Control | Cupola Slag Blend |
| 3 | 4,410 | 2,570 | — | — |
| 7 | 5,530 | 4,320 | 785 | 490 |
| 28 | 7,150 | 7,780 | 750 | 755 |
| 56 | 7,530 | 8,740 | 770 | 750 |
| 90 | 7,710 | 8,630 | — | — |

Table 6 demonstrates that the cupola slag blended cement at days 3 and 7 displays a lower compressive strength when measured using the ASTM C29 method. By day 28, however, the compressive strength of the cupola slag has surpassed that of the control cement, a totally unexpected result. Additionally, the compressive strength of the cupola slag blended cement unexpectedly continued to increase until after day 56 where it begins to level off. At day 56 the compressive strength of the cupola slag blended cement is more that 1,200 psi greater than the control cement. These tests indicate the surprising result that the cupola slag blended cement makes superior concrete over that made with conventional cements. Table 6 demonstrates that the flexural strength of the cupola slag blended cement as measured by the ASTM C78 method develops at a slower rate than that of the control but after 28 days is approximately equal to that of the control cement.

X-Ray Diffraction Analysis

X-ray diffraction may be used to identify and quantify crystalline materials. Crystalline materials consist of ordered arrangements of atoms in three-dimensional arrays. Such arrays have characteristic spacings between the layers of closely packed atoms. The length of the spacings vary by atom size and the three dimensional arrays.

When a powdered sample is subjected to a beam of radiation from an X-ray source a diffraction pattern is created. The X-ray beam penetrates the powder a short distance and diffracts from the most densely packed layers of the atoms within the powdered sample. The X-ray beam is rotated through a series of angles relative to the surface of the powdered sample. When the signal from the diffracted beam is particularly strong, the distances between layers of atoms (the d-spacings) can be calculated as multiples of the wavelengths of the incident radiation and the incident angle.

A crystalline material has a characteristic pattern of relative peak heights at given angles. Mixtures of crystalline materials display combinations of these patterns and the relative peak heights from various materials can be used to quantify the relative concentration of each crystalline material. X-ray diffraction may also be used to identify cracks in concrete. The detection limit for X-ray will depend on the type of material analyzed and it can be as high as 5 to 10%.

A ground granulated cupola furnace slag sample was finely powdered and subjected to XRD analysis on a Philips PW 1720 X-ray diffractometer (CuKO) equipped with a θ-compensating slit, graphite monochromator, gas proportional counter detector, pulse height selector and a strip chart recorder. A commercial granulated blast furnace slag sample was also finely powdered and analyzed as a control. Each sample was scanned from 65°2θ to 6°2θ at a rate of 1°2θ per minute. Table 7 is a summary of the phases detected by XRD.

TABLE 7

X-ray Diffraction Analysis

| Sample | Largest Phase Detected | Crystalline material |
|---|---|---|
| Cupola Furnace Slag | Amorphous material with a peak at 29.8° 2θ | $SiO_2$ (α-quartz) |
| Blast Furnace Slag | Amorphous material with a peak at 31° 2θ | $CaCO_3$ (calcite) |

As can be seen from Table 7, the two slag samples vary in their crystalline composition as well as their non-crystalline or glassy composition. The cupola slag sample has an amorphous phase peak at 29.8°2θ (lower angle) indicating a larger d-spacing than that of the blast furnace slag. The XRD analysis also shows that crystalline $SiO_2$ is present in the cupola slag which suggests a more acidic form of the amorphous phase. The amorphous phase of the cupola slag probably contains of higher amounts of not only $SiO_2$ but also $Al_2O_3$ and $Fe_3O_3$ than the blast furnace slag.

All references and standards cited herein are incorporated in their entireties.

What is claimed is:

1. A cement mixture comprising cupola slag blended with a hydraulic cement, wherein the cupola slag is ground to a fineness greater than 4,240 $cm^2/g$.

2. The cement mixture of claim 1, wherein the cupola slag is ground to a fineness greater than 5,000 $cm^2/g$.

3. The cement mixture of claim 2, wherein the cupola slag is ground to a fineness greater than 6,000 $cm^2/g$.

4. The cement mixture of claim 2, wherein the cupola slag is ground to a fineness of between 6,000 $cm^2/g$ and 7,000 $cm^2/g$.

5. The cement mixture of claim 4, wherein the cupola slag is ground granulated.

6. The cement mixture of claim 3, wherein the cupola slag comprises between 32% and 45% $SiO_2$, between 7% and 17% $Al_2O_3$, between 29% and 42% CaO, and between 2% and 19% MgO.

7. The cement mixture of claim 3, wherein the hydraulic cement is portland cement.

8. A cement mixture comprising between 5% and 50% by volume of cupola slag blended with a hydraulic cement, wherein the cupola slag is ground to a fineness greater than 4,240 $cm^2/g$.

9. The cement mixture of claim 8 comprising between 20% and 40% by volume of cupola slag.

10. The cement mixture of claim 9 comprising about 35% by volume of cupola slag.

11. The cement mixture of claim 8, wherein the cupola slag is ground to a fineness of greater than 5,000 cm$^2$/g.

12. The cement mixture of claim 11, wherein the cupola slag is ground to a fineness of between 6,000 cm$^2$/g and 7,000 cm$^2$/g.

13. The cement mixture of claim 12, wherein the cupola slag is ground granulated.

14. The cement mixture of claim 13, wherein the hydraulic cement is portland cement.

15. A concrete prepared by the process of blending cupola slag, hydraulic cement, and aggregate, wherein the cupola slag is ground to a fineness greater than 4,240 cm$^2$/g.

16. The concrete of claim 15, further comprising the steps of:

(a) adding water; and (b) curing.

17. The concrete of claim 16, wherein the cured concrete displays a flexural strength greater than 700 psi.

18. The concrete of claim 17, wherein a 72 hour heat of hydration of the cured concrete is less than about 250 J/g.

19. The concrete of claim 18, wherein the cured concrete mortar bar 14 day expansion is less than about 0.2%.

20. A road surface comprising the concrete according to claim 15.

21. A concrete floor comprising the concrete according to claim 15.

22. A concrete building material comprising the concrete according to claim 15.

23. A mass concrete pour comprising the concrete according to claim 15

24. A method of improving the strength of a cement comprising blending between 20% and 40% by volume of ground granulated cupola slag with the cement, wherein the cupola slag is ground to a fineness greater than 4,000 cm$^2$/g.

25. The method of improving the strength of a cement according to claim 24 comprising blending about 35% by volume of ground granulated cupola slag with the cement.

26. The method of improving the strength of cement according to claim 24, wherein the ground granulated cupola slag has a fineness of at least 6,000 cm$^2$/g.

27. The method of improving the strength of cement according to claim 24, wherein the cement is portland cement.

28. The cement mixture of claim 1, produced by the process of first grinding the cupola slag and subsequently mixing the ground cupola slag with a hydraulic cement.

29. The cement mixture of claim 28, wherein said hydraulic cement is produced by the process of grinding materials comprising blast furnace slag.

30. The cement mixture of claim 1, produced by the process of grinding cupola slag together with cement clinker.

31. The cement mixture of claim 30, wherein said cement clinker is comprised of blast furnace slag.

32. The cement mixture of claim 8, produced by the process of first grinding the cupola slag and subsequently mixing the ground cupola slag with a hydraulic cement.

33. The cement mixture of claim 32, wherein said hydraulic cement is produced by the process of grinding materials comprising blast furnace slag.

34. The cement mixture of claim 8, produced by the process of grinding cupola slag together with cement clinker.

35. The cement mixture of claim 34, wherein said cement clinker is comprised of blast furnace slag.

36. The process of claim 15, wherein the cupola slag and hydraulic cement are independently ground before the blending step.

37. The process of claim 36, wherein the hydraulic cement is produced by the process of grinding materials comprising blast furnace slag.

38. The process of claim 15, further comprising the step of grinding the cupola slag together with cement clinker.

39. The process of claim 38, wherein said cement clinker is comprised of blast furnace slag.

* * * * *